Dec. 14, 1937.  W. LENZ  2,102,425
FÖTTINGER DRIVE
Filed March 23, 1936.
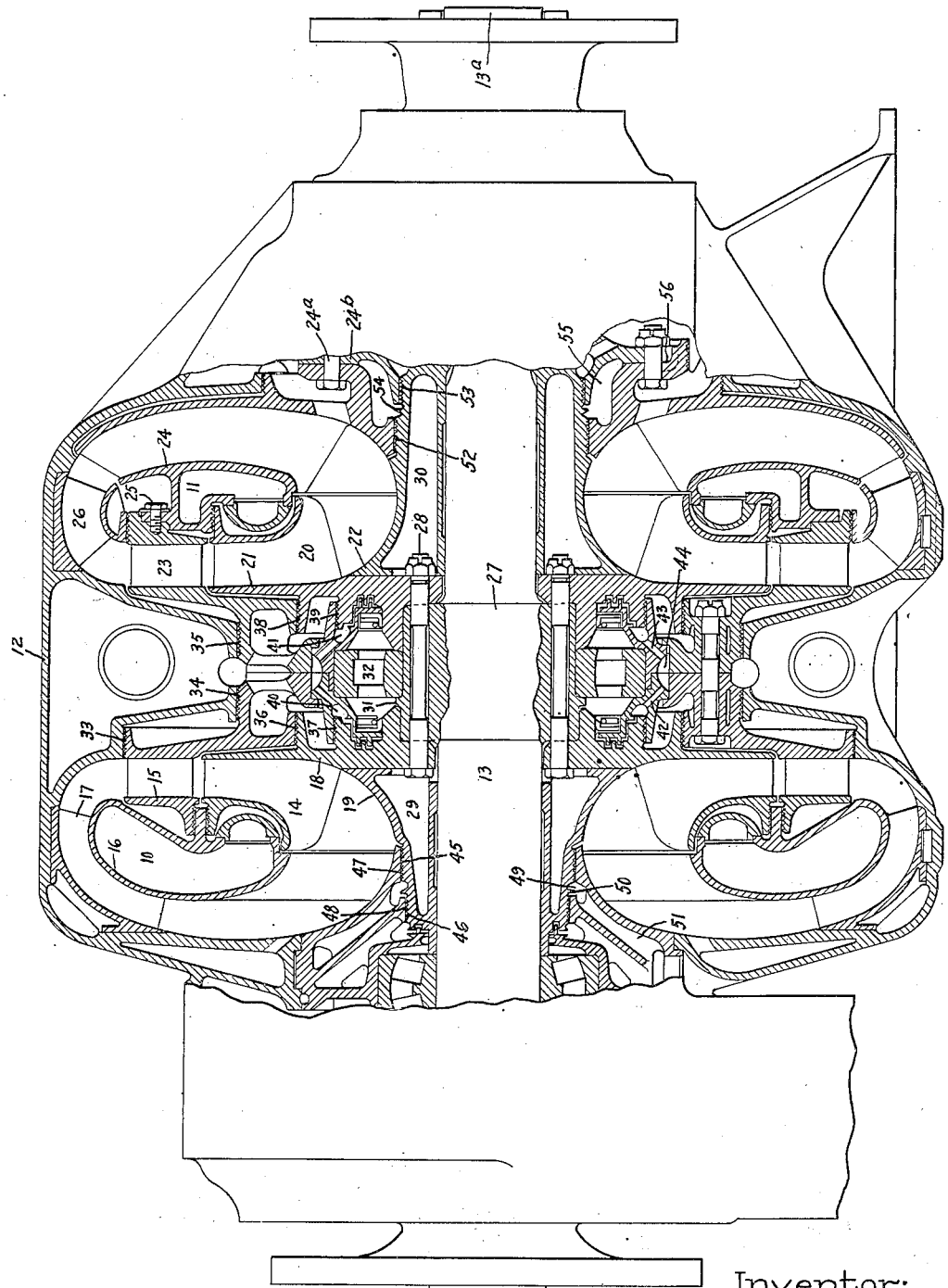
Inventor:
Walter Lenz,
by Harry E. Dunham
His Attorney.

Patented Dec. 14, 1937

2,102,425

UNITED STATES PATENT OFFICE 2,102,425

FÖTTINGER DRIVE

Walter Lenz, Berlin-Reinickendorf-West, Germany, assignor to General Electric Company, a corporation of New York Application March 23, 1936, Serial No. 70,503
In Germany April 25, 1935

2 Claims. (Cl. 60—54)

The present invention relates to Föttinger drives, that is, to hydraulic gears in which torque is transmitted to or converted between two rotatable elements known as pump and turbine wheels by means of a liquid such as water or oil, the liquid being confined in a liquid circuit including the pump and the turbine wheels. As the operation of such drives depends upon the provision of liquid, it is important properly to seal the liquid, that is, to reduce leakage thereof along clearances defined between rotary and stationary elements, more broadly between elements moving relative to each other. It is also important securely to fasten the pump wheels to the drive shaft without causing the setting up excessive stresses in the drive shaft or weakening the latter as may be caused by the provision of key ways.

One object of my invention is to provide an improved construction and arrangement of Föttinger gears whereby leakage of operating liquid is substantially reduced.

Another object of my invention is to provide an improved arrangement of Föttinger gears whereby the pump wheels are securely fastened to the drive shaft and weakening of the drive shaft due to this fastening is entirely eliminated.

For a consideration of what I believe to be novel and my invention, attention is directed to the following description and the claims appended thereto in connection with the accompanying drawing.

The single feature of the drawing represents a Föttinger gear embodying my invention. In the present instance I have shown a double gear, more specifically a double torque converter, each converter having a pump wheel secured to a common drive shaft.

The hydraulic gear comprises two torque converters 10 and 11 having a common stationary casing 12, a drive shaft 13 and a driven shaft 13a. The converter 11 is used primarily at low and medium speed, whereas the converter 10 is used at normal and at high speed. Only one converter is operated at one time. During the operation of one converter the liquid in the other converter is discharged in known manner. The first torque converter 10 has a pump wheel 14, a turbine wheel 15 and a stationary element 16 with guides 17 to conduct operating liquid discharged from the turbine wheel to the inlet of the pump wheel. The pump wheel or driving element consists of two portions, a blade-carrying portion 18 and an inlet portion 19 for conducting the operating liquid to the blade-carrying portion 18. The second converter or gear 11 is similar but distinguishes in that the torque converted by the first gear 10 and imported to the turbine wheel 15 thereof has to be transmitted through the second gear 11 to a driven shaft. The second gear 11 comprises a pump wheel 20 having a blade-carrying portion 21 and an inlet portion 22 for directing operating liquid to the blade-carrying portion 21. The pump wheel 20 discharges into a turbine wheel which comprises a first element 23 and a second element 24 united by means of bolts 25 and separated as regards the liquid circuit by a liquid guide member 26. Liquid discharged by the pump wheel 20 flows through the turbine wheel element 23 to which a part of its energy is imparted. The liquid then discharged from the element 23 flows through the guide member 26 into the second turbine wheel element 24, to which latter another part of the available energy is imparted. The liquid discharged from the element 24 flows into the pump wheel inlet member 22 from which it is directed into the pump wheel, blade-carrying element 21. The turbine wheel 23, 24, more specifically the element 24, is connected by means of bolts 24a, to a driven element 24b which forms a part of the driven shaft 13a.

The two converters are arranged adjacent each other with their pump wheels back to back. The blade-carrying pump wheel elements or portions 18 and 21 in accordance with my invention are secured to a collar 27 of the shaft 13 by a plurality of axial bolts and nuts 28. This arrangement has the great advantage that it completely eliminates the necessity for key ways in the shaft which often cause undesirable weakening of the latter or, from another viewpoint, necessitate the provision of a heavier shaft. The inlet members 19 and 22 for the pump wheels surround portions of the shaft 13 and form annular spaces 29 and 30 respectively for accommodating the bolt heads and the nuts secured to the bolts. The chambers 29 and 30 are always empty, that is, free from operating liquid and thus forming a protection for the bolts, particularly the nuts, against the corrosive action of water when used as operating liquid.

The shaft collar 27 has an outer surface which is machined and forms an annular projection 31, facilitating and assuring proper positioning of the pump wheels of the two converters. The pump wheel portion 18 of the converter 10 abuts the left-hand side of the annular projection 31 and between the right-hand side of the annular projection 31 and the adjacent end portion of the pump wheel portion 21 of the converter 11 I dispose an anti-friction bearing 32 for the turbine wheels. Leakage of fluid from one converter into the other converter is prevented or reduced by the provision of a plurality of packings between the elements rotating relative to each other. The turbine wheels 15, 23 are sealed against the stationary outer casing 12 by packings 33, 34 and 35, and the turbine wheels 15, 23 are sealed against the pump wheel portions 14, 20 by packings 36, 37, 38 and 39. These packings are also important to reduce leakage of operating fluid to the bearings 32. As an additional means for reducing such leakage, packing chambers 40 and 41 are formed by the pump wheels, which chambers communicate through channels 42 and 43 respectively with an annular chamber 44 from which leakage fluid is discharged through a conduit, not shown.

Another important feature of my invention is the provision of improved sealing means to reduce the leakage of operating fluid along the drive shaft. As stated above, each pump wheel has an inlet portion or member 19 and 22 respectively surrounding the drive shaft. The pump inlet member 19 in accordance with my invention is provided with inner packing teeth 45 and outer packing teeth 46 cooperating with packing surfaces 47 and 48 respectively of the stationary casing. The latter defines between the two sets of packing teeth a chamber 49. The portion of the inlet member 19 intermediate the two sets of packing teeth forms a radial projection or deflector 50. The inner set of packing teeth 45 has a larger diameter than the outer set of packing teeth 46. The chamber 49 communicates with the atmosphere through a channel 51. With this arrangement operating liquid leaking along the inner set of packing teeth 45 is prevented by the deflector 50 from flowing directly towards the outer set of packing teeth 46. Leakage fluid is discharged from the chamber 49 through the channel 51. The packing arrangement for the second converter 11 is similar to that just described but whereas with regard to the first converter 10 the packing arrangement is formed between the pump inlet element 19 and a stationary member, that for the second converter is formed between the pump inlet portion 22 and the turbine wheel element 24. The packing arrangement also comprises two sets of packing teeth 52 and 53 cooperating with corresponding packing surfaces formed on a cylindrical portion of the turbine wheel element 24. The pump inlet portion 22 intermediate the two sets of packing teeth forms a radial projection or deflector 54 which projects into a chamber 55 formed by the turbine wheel element 24. The deflector 54 prevents liquid leaking along the packing teeth 52 from flowing directly towards the packing teeth 53. Liquid flowing into the chamber 55 is discharged through a channel 56.

Having described the method of operation of my invention, together with the apparatus which I now consider to represent the best embodiment thereof, I desire to have it understood that the apparatus shown is only illustrative and that the invention may be carried out by other means. In particular I wish to have it understood that the invention is not limited to a particular type of Föttinger gears but applies to both hydraulic couplings as well as converters, single gears as well as multiple gears.

What I claim as new and desire to secure by Letters Patent of the United States is:

1. A multiple hydraulic gear of the Föttinger type with a plurality of separate liquid circuits comprising the combination of a single drive shaft having a collar, at least two gears, each gear having a pump wheel, the two pump wheels arranged back to back, and means flanging the back to back arranged pump wheels to the collar.

2. A multiple hydraulic gear of the Föttinger type with a plurality of liquid circuits comprising the combination of a single drive shaft having a collar, two hydraulic gears, each having a pump wheel, each pump wheel having a blade-carrying portion and a separate inlet portion, and the blade-carrying portions being arranged back to back and secured to the collar.

WALTER LENZ.